United States Patent
Schnaare et al.

(10) Patent No.: US 7,869,805 B2
(45) Date of Patent: Jan. 11, 2011

(54) METHOD OF SELECTING DATA COMMUNICATION PROVIDER IN A FIELD DEVICE

(75) Inventors: Theodore H. Schnaare, Carver, MN (US); Philip G. Ostby, Cologne, MN (US); Gabriel L. Sierra, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 480 days.

(21) Appl. No.: 11/441,539

(22) Filed: May 26, 2006

(65) Prior Publication Data

US 2006/0267792 A1    Nov. 30, 2006

Related U.S. Application Data

(60) Provisional application No. 60/685,121, filed on May 27, 2005.

(51) Int. Cl.
*H04Q 7/20* (2006.01)
(52) U.S. Cl. ............. 455/434; 455/226.2; 455/161.3; 455/151.1
(58) Field of Classification Search ............ 340/870.02, 340/870.07; 709/223; 455/414.1, 414.3, 455/226.2; 379/106.3, 114.02
See application file for complete search history.

(56) References Cited

U.S. PATENT DOCUMENTS

| | | | | |
|---|---|---|---|---|
| 4,475,047 | A | 10/1984 | Ebert | 307/66 |
| 5,682,476 | A | 10/1997 | Tapperson et al. | 395/200.05 |
| 5,793,963 | A | 8/1998 | Tapperson et al. | 395/200.31 |
| 6,272,343 | B1 * | 8/2001 | Pon et al. | 455/434 |
| 6,657,549 | B1 * | 12/2003 | Avery | 340/825.49 |
| 6,711,446 | B2 | 3/2004 | Kirkpatrick et al. | 700/19 |
| 6,774,814 | B2 | 8/2004 | Hilleary | 340/870.07 |
| 6,891,838 | B1 | 5/2005 | Petite et al. | 370/401 |
| 7,010,294 | B1 | 3/2006 | Pyotsia et al. | 455/420 |
| 7,058,542 | B2 | 6/2006 | Hauhia et al. | 702/183 |
| 7,061,398 | B2 * | 6/2006 | Holmes et al. | 340/870.01 |
| 7,233,745 | B2 | 6/2007 | Loechner | 398/128 |
| 7,262,693 | B2 | 8/2007 | Karschnia et al. | 340/508 |

(Continued)

FOREIGN PATENT DOCUMENTS

JP    2003051894    2/2003

(Continued)

OTHER PUBLICATIONS

Communication from European Patent Office in related Application No. 06 771 538.3, Apr. 22, 2008.

(Continued)

*Primary Examiner*—Timothy Edwards, Jr.
(74) *Attorney, Agent, or Firm*—Christopher R. Christenson; Westman, Champlin & Kelly, P.A.

(57) ABSTRACT

A method and apparatus are provided for allowing a field device to select a data communication provider among a plurality of available data communication providers. Preferably, the method includes periodically, or selectively, assessing the strengths and efficacy of data communication on one or more alternate data communication providers. The data communication provider with the strongest signal and/or most effective data communication is selected for use by the field device. Preferably, the field device logs events where it switches among data communication providers.

10 Claims, 6 Drawing Sheets

U.S. PATENT DOCUMENTS

| | | |
|---|---|---|
| 7,271,679 B2 | 9/2007 | Lundberg et al. ............. 333/24 |
| 2002/0065631 A1 | 5/2002 | Loechner ................... 702/188 |
| 2003/0171827 A1 | 9/2003 | Keyes et al. ................. 700/19 |
| 2003/0204371 A1 | 10/2003 | Sciamanna ................. 702/183 |
| 2004/0086021 A1 | 5/2004 | Litwin ....................... 374/120 |
| 2004/0151293 A1* | 8/2004 | Jensen et al. ........... 379/114.02 |
| 2004/0203434 A1 | 10/2004 | Karschnia et al. ........ 455/67.11 |
| 2004/0259533 A1 | 12/2004 | Nixon et al. ............. 455/414.1 |
| 2005/0055432 A1* | 3/2005 | Rodgers .................... 709/223 |
| 2005/0072239 A1 | 4/2005 | Longsdorf et al. ............ 73/649 |
| 2005/0164684 A1 | 7/2005 | Chen et al. ............... 455/414.1 |
| 2005/0201349 A1 | 9/2005 | Budampati ................. 370/342 |
| 2005/0245291 A1 | 11/2005 | Brown ....................... 455/572 |
| 2005/0276233 A1 | 12/2005 | Shepard et al. ............ 370/254 |
| 2005/0281215 A1 | 12/2005 | Budampati et al. .......... 370/328 |
| 2006/0002368 A1 | 1/2006 | Budampati et al. .......... 370/351 |
| 2006/0092039 A1 | 5/2006 | Saito et al. ............ 340/825.37 |
| 2006/0181406 A1 | 8/2006 | Petite et al. ................. 340/521 |
| 2006/0227729 A1 | 10/2006 | Budampati et al. .......... 370/278 |
| 2006/0274644 A1 | 12/2006 | Budampati et al. .......... 370/216 |
| 2006/0274671 A1 | 12/2006 | Budampati et al. .......... 370/254 |
| 2006/0287001 A1 | 12/2006 | Budampati et al. ....... 455/552.1 |
| 2007/0030816 A1 | 2/2007 | Kolavennu ................. 370/252 |
| 2007/0030832 A1 | 2/2007 | Gonia et al. ................ 370/338 |
| 2007/0229255 A1 | 10/2007 | Loechner ................... 340/540 |
| 2007/0233283 A1 | 10/2007 | Chen .......................... 700/17 |
| 2007/0237137 A1 | 10/2007 | McLaughlin ............... 370/389 |
| 2007/0280144 A1 | 12/2007 | Hodson et al. ............. 370/312 |
| 2007/0280178 A1 | 12/2007 | Hodson et al. ............. 370/338 |
| 2007/0280286 A1 | 12/2007 | Hodson et al. ............. 370/466 |
| 2007/0280287 A1 | 12/2007 | Samundrala et al. ........ 370/466 |
| 2007/0282463 A1 | 12/2007 | Hodson et al. ................ 700/20 |
| 2007/0288204 A1 | 12/2007 | Gienke et al. .............. 702/188 |

FOREIGN PATENT DOCUMENTS

| | | |
|---|---|---|
| JP | 2003134261 | 5/2003 |
| JP | 2004021877 | 1/2004 |
| WO | WO 03/023536 | 3/2003 |

OTHER PUBLICATIONS

European Search Report from International Application No. PCT/US2006/020835 filed May 26, 2006.
First Office Action for Chinese patent application No. 200680013690.8, mailed Sep. 19, 2008.
Office Action from Russian Patent Office in Russian Serial No. 2006145434, 2006.
Office Action from U.S. Patent Office in U.S. Appl. No. 11/028,486.
Examination Report from European Patent Office in related Application No. 05 853 808.3.
Second Office Action for Chinese patent application No. 200680013690.8, mailed Apr. 3, 2009.
Official Action issued for Russian patent application No. 2007149279, dated Jun. 1, 2009, 5 pgs.
Rejection Decision issued for Chinese patent application No. 200680013690.8, dated Oct. 16, 2009, 5 pgs.
The first Office Action for Japanese patent application No. 2008-513817, dated Aug. 17, 2010.

* cited by examiner

METHOD OF SELECTING DATA COMMUNICATION PROVIDER IN A FIELD DEVICE

CROSS-REFERENCE TO RELATED APPLICATION

The present application is based on and claims the benefit of U.S. provisional patent application Ser. No. 60/685,121, filed May 27, 2005, the content of which is hereby incorporated by reference in its entirety.

BACKGROUND OF THE INVENTION

In industrial settings, control systems are used to monitor and control inventories of industrial and chemical processes, and the like. Typically, the control system performs these functions using field devices distributed at key locations in the industrial process and operably coupled to control circuitry by a process control loop.

Some field devices include various analytical equipment, pressure sensors, thermistors, thermocouples, strain gauges, and the like. Typically, each field device also includes communication circuitry that is used for communicating with a process control room, or other circuitry, over a process control loop. In some installations, the process control loop is also used to deliver a regulated current and/or voltage to the field device for powering the field device. The process control loop also carries data, either in an analog or digital format.

Traditionally, analog field devices have been connected to the control room by two-wire process control current loops, with each device connected to the control room by a single two-wire control loop. Typically, a voltage differential is maintained between the two wires within a range of voltages from 12-45 volts for analog mode and 9-50 volts for digital mode. Some analog field devices transmit a signal to the control room by modulating the current running through the current loop to a current proportional to the sensed process variable. Other analog field devices can perform an action under the control of the control room by controlling the magnitude of the current through the loop. In addition to, or in the alternative, the process control loop can carry digital signals used for communication with field devices. Digital communication allows a much larger degree of communication than analog communication. Field devices that communicate digitally can respond to and communicate selectively with the control room and/or other field devices. Further, such devices can provide additional signaling such as diagnostics and/or alarms.

In some installations, wireless technologies have begun to be used to communicate with field devices. While many such wireless technologies have generally been developed to provide inexpensive data communication, such technologies have not been adapted for high reliability data communication. In distinct contrast, field devices sometimes provide crucial information required for effective control or monitoring of a given process. Should the process information not be communicated effectively, the process itself could degrade, or need to be taken completely offline for maintenance.

SUMMARY

A method and apparatus are provided for allowing a field device to select a data communication provider among a plurality of available data communication providers. Preferably, the method includes periodically, or selectively, assessing the strengths and efficacy of data communication on one or more alternate data communication providers. The data communication provider with the strongest signal and/or most effective data communication is selected for use by the field device. Preferably, the field device logs events where it switches among data communication providers.

DETAILED DESCRIPTION

Figure 1:
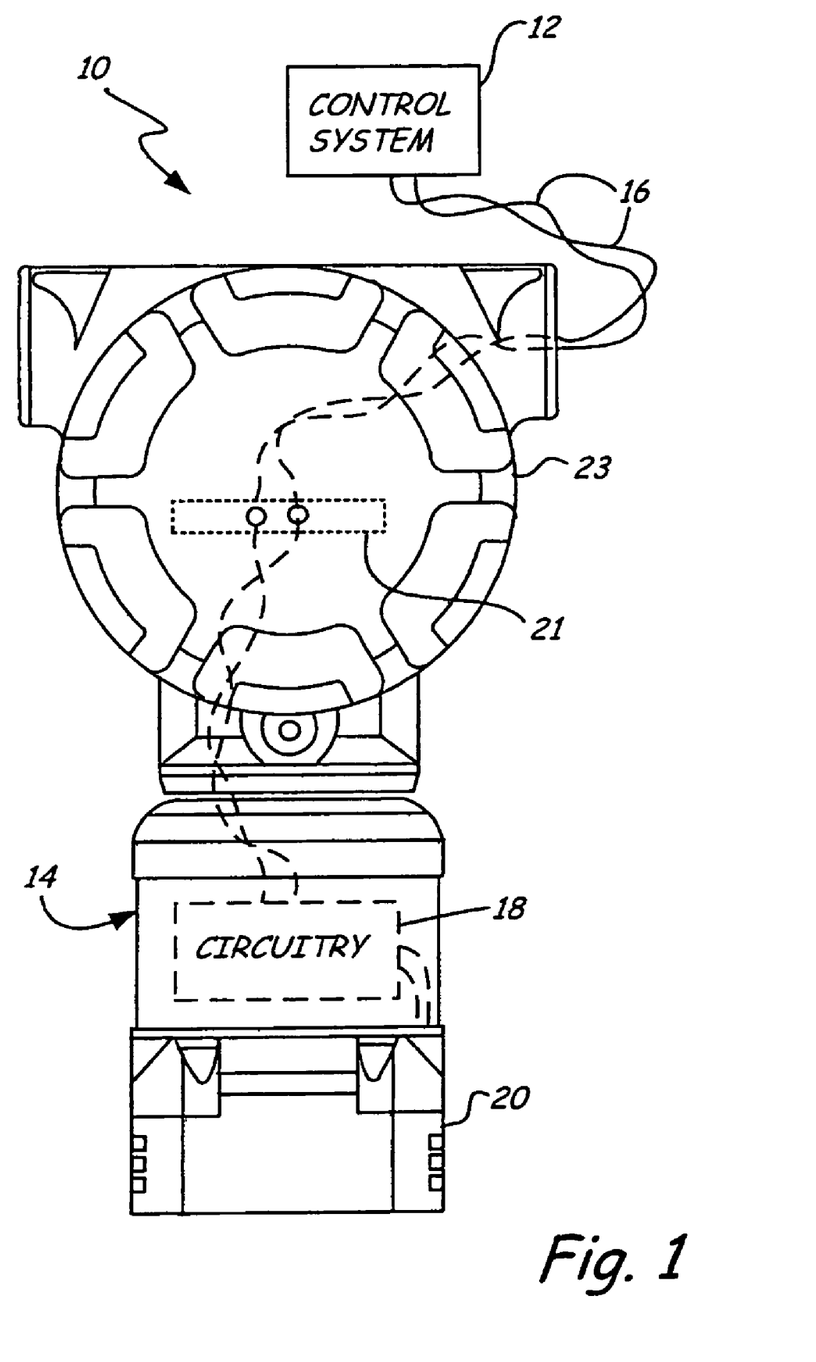
FIG. 1 is a diagrammatic view of an exemplary field device with which the wireless power and communication unit in accordance with the present invention is particularly useful.
Figure 2:
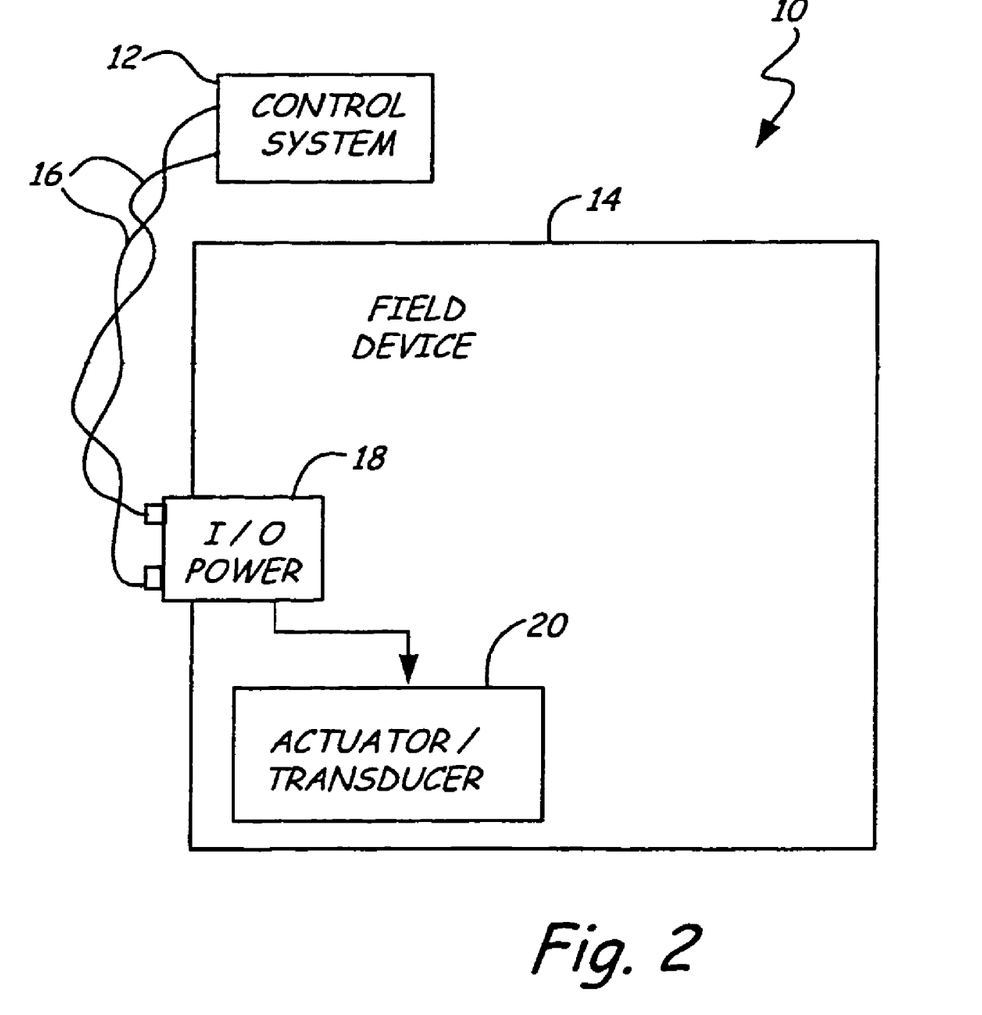
FIG. 2 is a block diagram of the field device shown in FIG. 1.

FIGS. 1 and 2 are diagrammatic and block diagrammatic views of an exemplary field device with which embodiments of the present invention are particularly useful. Process control or monitoring system 10 includes a control room or control system 12 that couples to one or more field devices 14 over a two-wire process control loop 16. Examples of process control loop 16 include analog 4-20 mA communication, hybrid protocols which include both analog and digital communication such as the Highway Addressable Remote Transducer (HART®) standard, as well as all-digital protocols such as the FOUNDATION™ Fieldbus standard. Generally process control loop protocols can both power the field device and allow communication between the field device and other devices.

In this example, field device 14 includes circuitry 18 coupled to actuator/transducer 20 and to process control loop 16 via terminal board 21 in housing 23. Field device 14 is illustrated as a process variable (PV) generator in that it couples to a process and senses an aspect, such as temperature, pressure, pH, flow, or level of a process fluid and provides an indication thereof. Other examples of field devices include valves, actuators, controllers, and displays.

Generally field devices are characterized by their ability to operate in the "field" which may expose them to environmental stresses, such as temperature, humidity and pressure. In addition to environmental stresses, field devices must often withstand exposure to corrosive, hazardous and/or even explosive atmospheres. Further, such devices must also operate in the presence of vibration and/or electromagnetic interference. Some field devices are required to operate in extremely flammable or explosive environments. In such instances, field devices can be designed to comply with Intrinsic Safety requirements. For example, the field device can be design to comply with the intrinsic safety requirements set forth in: APPROVAL STANDARD INTRINSICALLY SAFE APPARATUS AND ASSOCIATED APPARATUS FOR USE IN CLASS I, II AND III, DIVISION 1 HAZARD- OUS (CLASSIFIED) LOCATIONS, CLASS NUMBER 3610, promulgated by Factory Mutual Research October, 1988.

Figure 3:
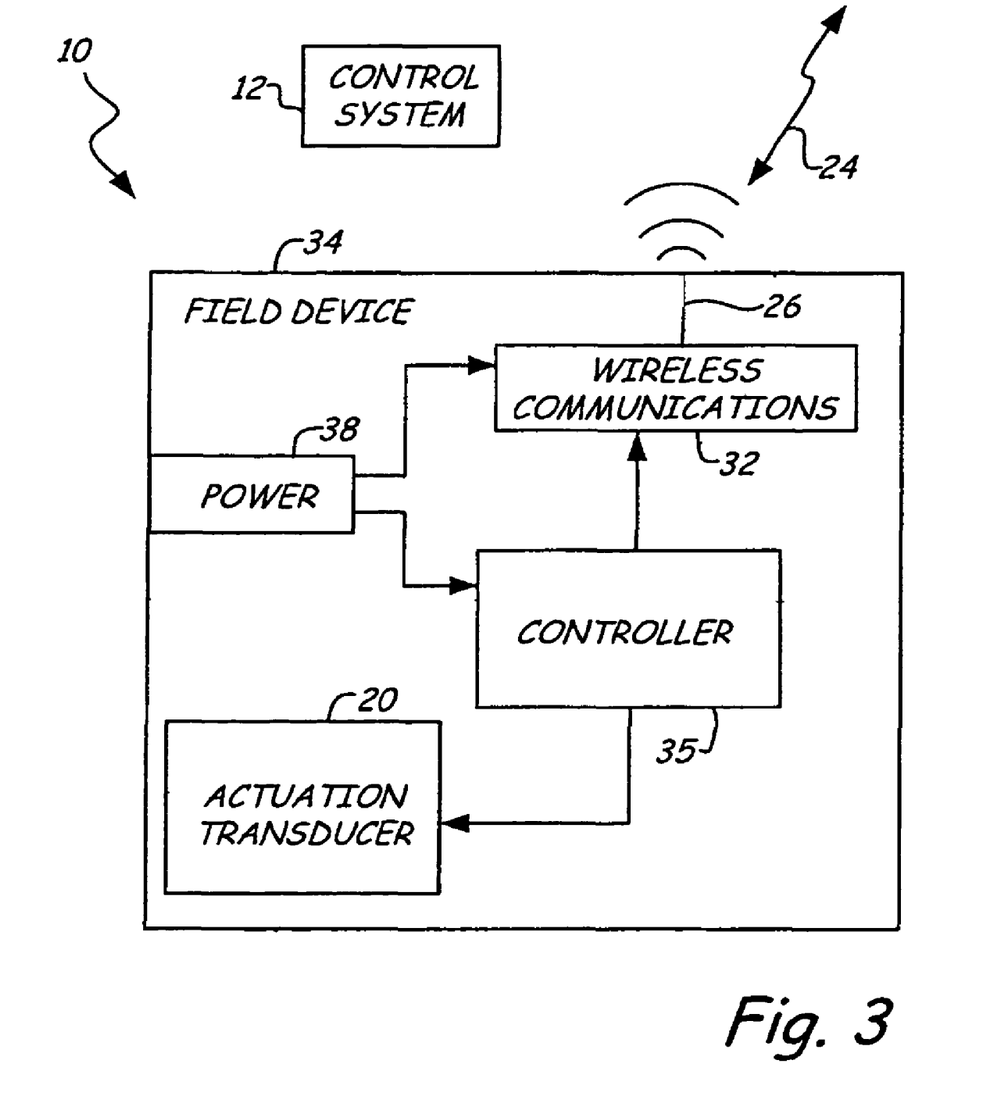
FIG. 3 is a block diagram of a field device including wireless communication circuitry for communicating with a remote device such as a display or hand held unit.

FIG. 3 is a block diagram of a wireless field device with which embodiments of the present invention are particularly useful. Field device 34 includes internal power supply module 38, controller 35, wireless communication module 32, and actuator/transducer 20. Power supply module 38 typically includes a battery that powers field device 34 for a period of time, until the battery needs to be replaced. Some field devices include a built-in solar cell. The power from supply 38 energizes controller 35 to interact with actuator/transducer 20 and wireless communications module 32. Wireless communications module 32, in turn, interacts with other devices as indicated by reference numeral 24 via antenna 26.

Field devices have only recently begun to use wireless communication providers such as those using cellular telephone signals; WiFi such as IEEE 802.11B or IEEE 802.11G; or even Bluetooth. One of the problems with using such technologies for process data communication is that for a cellular telephone conversation, a loss of signal may simply result in a dropped call. However, that same loss of signal in the context of process data communication could allow an industrial process to run out of control. Such a situation would be highly undesirable. Typical cell phone software generally stores a "preferred provider" during the initial power up. This preferred provider is not changed unless that particular provider is no longer accessible to the device even if a much stronger provider is present and accessible. This is the typical behavior of most cell phones that are "locked" to a particular provider. Not only does this behavior prevent the device from connecting to the strongest provider network, it also prevents the device from reconnecting to the strongest provider in the event that the particular provider is shutdown (for maintenance, etc.). This makes sense in the context of cell phones in that if a given user has subscribed to, for example, the Sprint cellular network, the user would not wish to roam to and pay for coverage on a Verizon network even if the signal of Verizon network were much stronger than the Sprint signal as long as the Sprint signal provided useable, even if marginally so, coverage.

Figure 4:
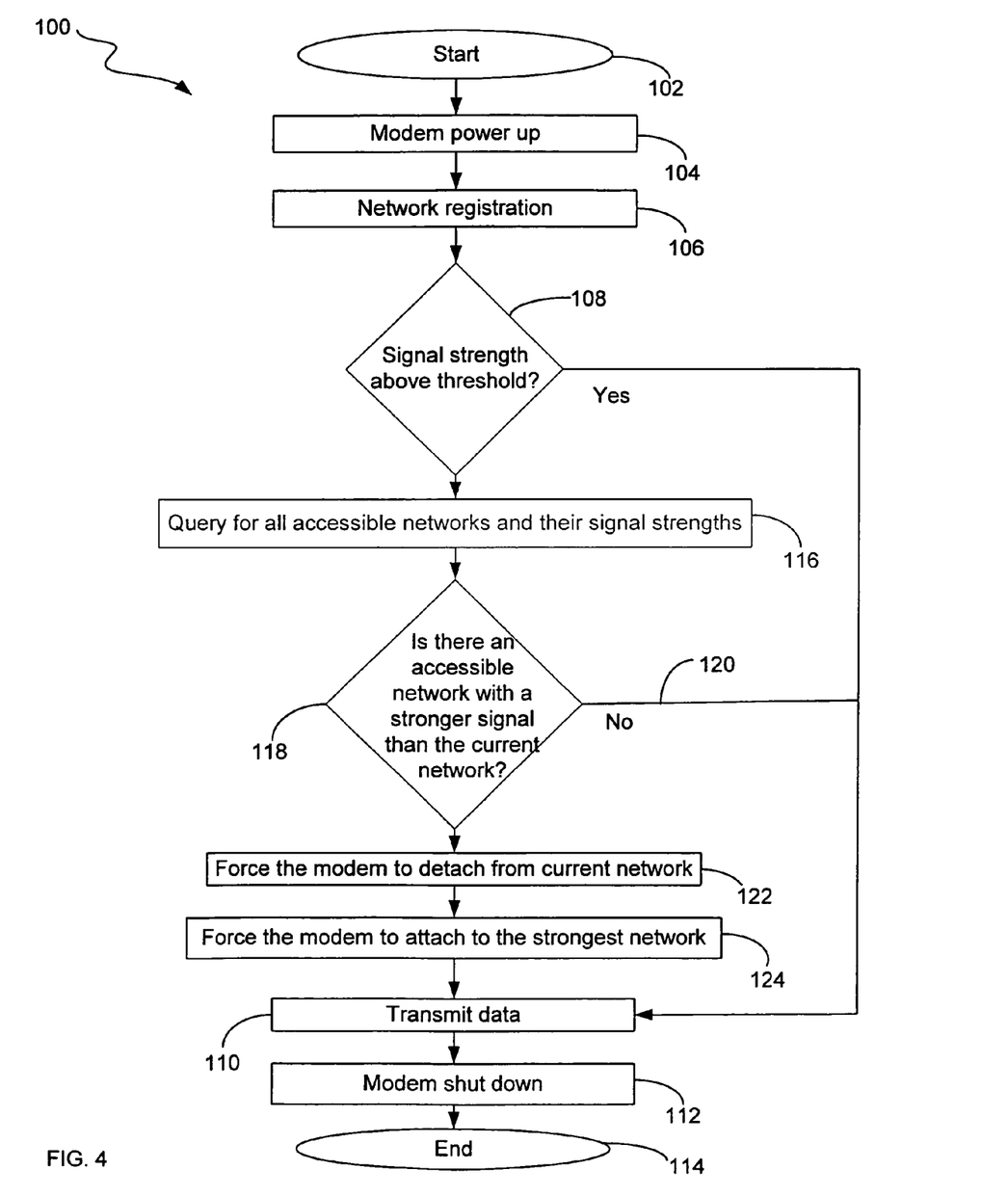
FIG. 4 is a diagrammatic view of a method for selecting a data communication provider with a field device in accordance with an embodiment of the present invention.

FIG. 4 is a diagrammatic view of a method for selecting a data communication provider with a field device in accordance with an embodiment of the present invention. Method 100 begins at block 102 marked Start. Once the method starts, the modem, or wireless communication transceiver of the field device is energized, as indicated at block 104. Once the modem is powered up, network registration occurs as indicated at block 106. Preferably, network registration registers the field device upon the last known good network, or some initial network set by the manufacturer of the field device. At block 108, the signal strength of the network, upon which the field device registered in block 106, is observed. If the signal strength is above a selected threshold, control passes from block 108 to block 110 where the field device transmits its process variable information. Examples of process variable information include any parameter, such as, without limitation, pressure, temperature, level and flow of process fluids. Once data has been transmitted by the field device at block 110, control passes to block 112 where the modem is shutdown. Subsequently, control passes to block 114 where the method ends.

If, at block 108, the signal strength of the network upon which the field device registered at block 106 is below the selected threshold, control passes to block 116 where the field device queries all accessible networks and their signal strengths. Accessible networks include all suitable GSM networks including those operating upon 850 megahertz; 900 megahertz; 1800 megahertz; and 1900 megahertz; using any suitable cellular telephone data communication protocol such as mobile system for mobile communications (GSM). Another example of a suitable cellular telephone technology includes code division multiple access (CDMA). Further still, other wireless communications providers can be queried including those employing such wireless technologies as those in accordance with IEEE 802.11b, IEEE 802.11g, or Bluetooth. Further still, other data communication providers can be used, such as those employing WiMax (IEEE 802.16 standard), IEEE 802.15.4, a local laptop PC, or any other data connectivity routes including, local area networks, wide area networks, personal area networks, satellite communication, local internet service providers, personal computers, Plain Old Telephone System (POTS), proprietary wireless networks, or a host data system. Once block 116 has completed and all accessible networks have been queried and their signal strengths determined, block 118 determines if there is an accessible network with a stronger signal than the current network. As used herein, the determination of a stronger signal may include simply determining the network with the largest amplitude signal. Additionally, or alternately, network communication quality, such as dropped packets and/or interference can be taken into consideration to artificially increases or diminish the measured signal amplitude. If the result of the determination at block 118 is that there is not any accessible network with a stronger signal than the current network, then control passes from block 118 along line 120 to block 110 and method 100 continues, as described above. If, however, during block 118, the field device determines that there is an accessible network with a stronger signal than the current network, then control passes to block 122 where the field device forces its modem or wireless communication module to detach from the network upon which it registered at block 106. At block 124, the field device forces its modem to attach to the strongest network as identified at block 118. Then, control passes from block 124 to block 110 where the field device's process information is transmitted on the newly attached strongest network.

Method 100 may be executed each time the field device needs to send process information. Alternatively, the field device may execute method 100 at a selected timing interval, or upon receipt of a suitable command, such as via its local operator interface, or over a second communication interface, such as a wired communication interface. Each time the field device switches data communication providers, the process of determining the highest signal strength, and switching to the data communication provider which has such highest signal strength consumes power. Preferably, the field device will log such data communication provider switches as well as maintain a history of its operation on various data communication providers. Then, if signal testing of two data communication providers appears to be substantially equal, the field device can make its decision on which data communication provider to pick based, at least in part, upon its history with one or both the providers. Accordingly, embodiments of the present invention include statistically tracking operation with the various data communication providers. Further, the statistical tracking can include tracking information determined from each and every signal strength test for the various accessible data communication providers. Accordingly, the statistical tracking can be used to develop a network preference in situations where multiple data communication providers have comparable signal strength.

Figure 5:
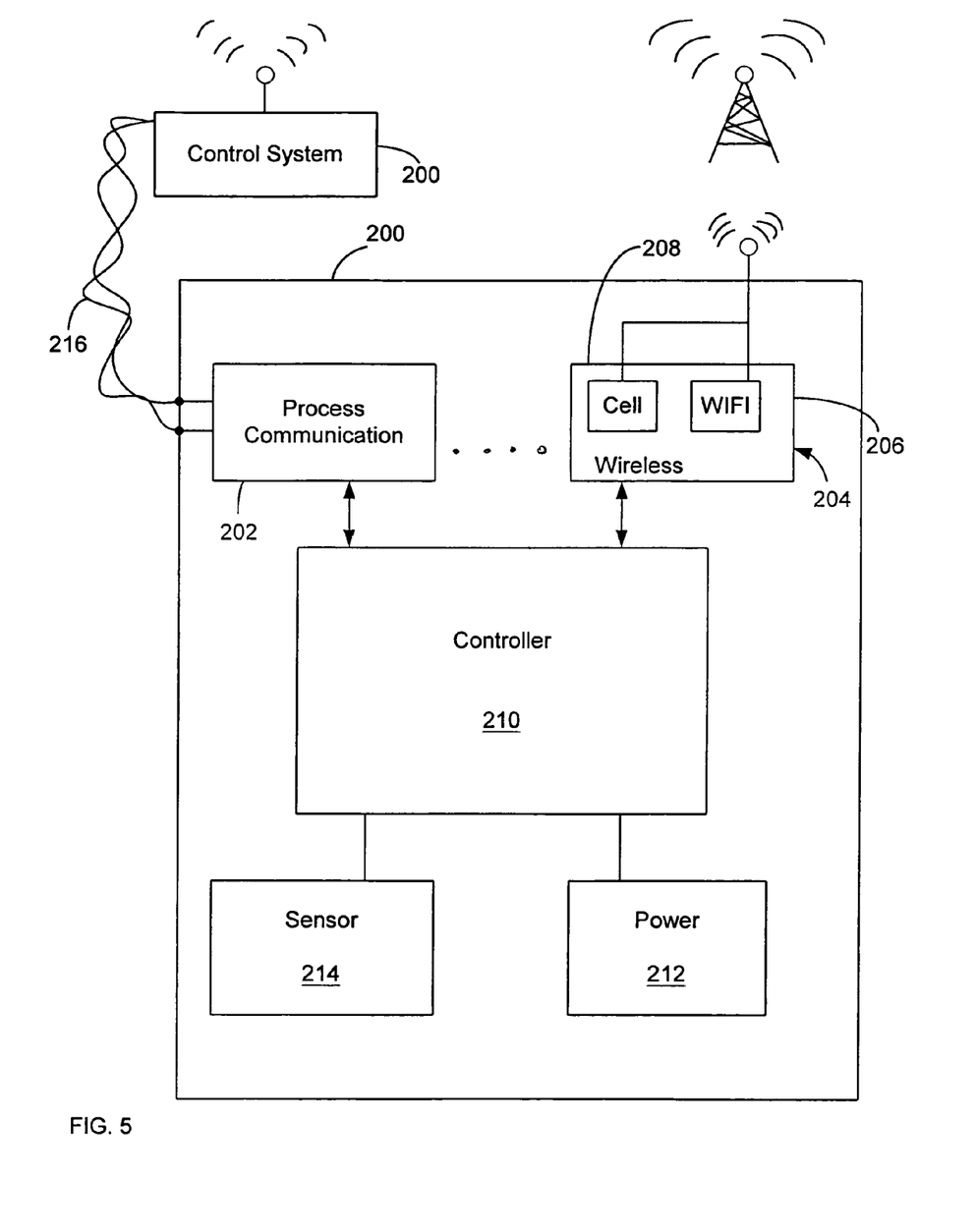
FIG. 5 is a diagrammatic view of field device running a method in accordance with an embodiment of the present invention.

FIG. 5 is a diagrammatic view of field device 200 running method 100 in accordance with one exemplary embodiment of the present invention. Field device 200, as illustrated, includes a wired process communication interface 202 and a wireless communication interface 204. Further, wireless communication interface 204 includes WiFi module 206, which may be adapted to communicate in accordance with IEEE 802.11g and cellular transceiver 208 which is adapted to communicate, in accordance with known cellular telephone communication technologies. While field device 200 is illustrated with three distinct data communication modules, embodiments of the present invention can be practiced with even a singular module (such as a cellular communication module) as long as multiple data communication providers are available to the field device via the singular module. Further, more than three modules can also be used in accordance with embodiments of the present invention. Controller 210 is coupled to wired process communication module 202 and wireless communication module 204 and engages modules 202 and 204 as described above with respect to method 100. Field device 200 also preferably includes a source of power, 212 which may be a battery, or an energy generation source, such as a photovoltaic solar panel. Moreover, in environments where field device 200 is coupled to a process communication loop 216 which is able to wholly power field device 200, power module 212 may be integrated with process communication module. Preferably, field device 200 also includes at least one sensor 214 that is configured to sense some process parameter of interest and provide an electrical indication of such sensed parameter to controller 210. Periodically, or continuously, field device 200 acquires or otherwise transduces a process variable via sensor 214. Then, field device 200 determines which data communication network to send the process information through. Specifically, controller 210 causes process communication module 202 to asses the quality of data communication upon process communication loop 216. Additionally, controller 210 causes cell transceiver module 208 to identify all available cellular telephone networks, and their respective signal strengths. Further still, controller 210 causes WiFi module 206 to identify all available wireless networks within range, and their respective signal strengths. Then, controller 210 determines the process communication path with the best signal quality, and/or data throughput for communication of the process variable. Accordingly, as changes may occur to the various data communication networks, and/or the media through which they communicate, such as process communication loop 216, field device 200 can dynamically adjust data communication such that process information is easily rerouted through the next best available data communication network. Additionally, while embodiments of the present invention can be utilized to ensure communication over through the best data communication provider, communication can also be effected through other data communication providers. Thus, a field device operating in accordance with an embodiment of the present invention may, in fact, be actively communicating through multiple data communication providers simultaneously. Moreover, the group of data communication providers used may change as the field device discovers other, more effective, data communication providers.

Figure 6:
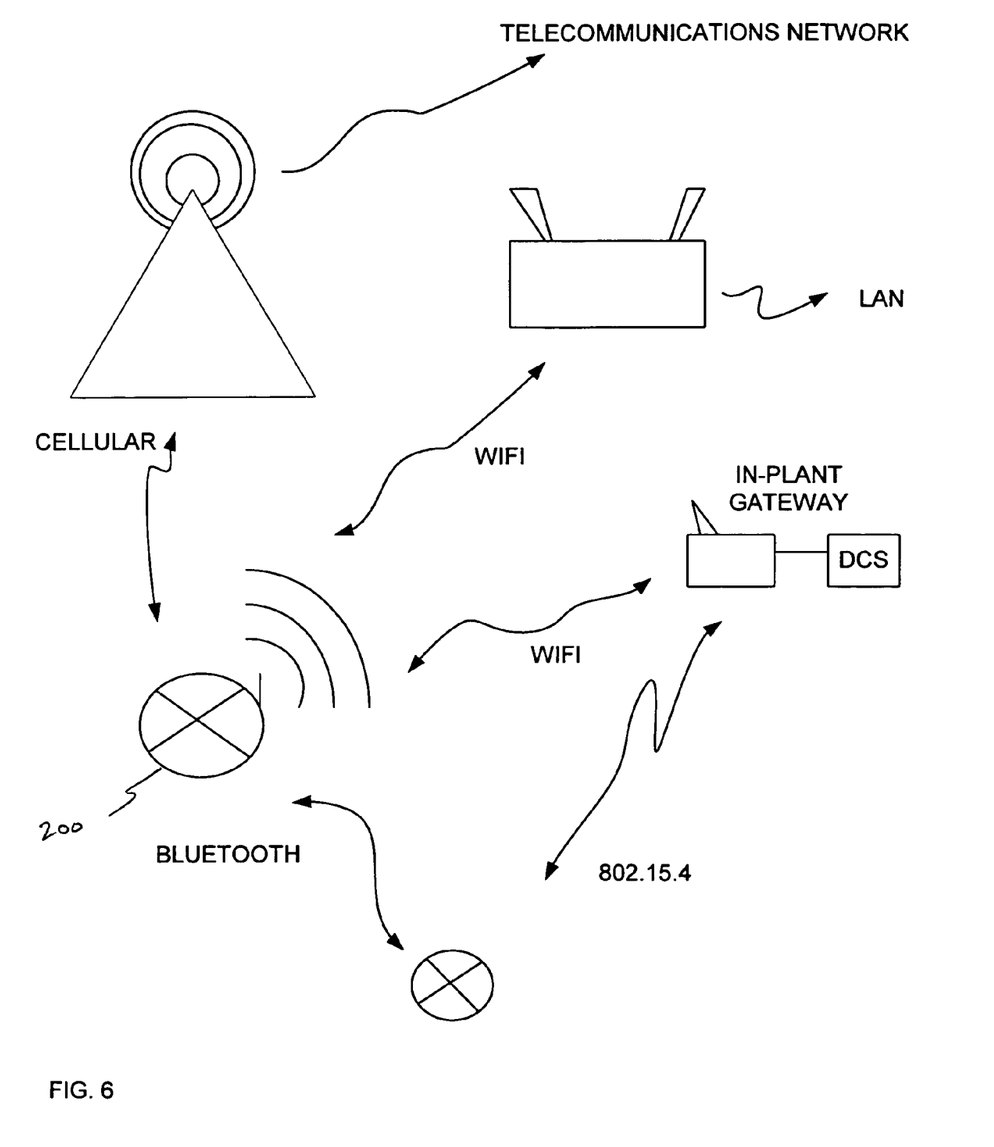
FIG. 6 is a diagrammatic view of a field device having potential data communication through a number of available providers in accordance with an embodiment of the present invention.

FIG. 6 is a diagrammatic view of a field device having potential data communication through a number of available providers in accordance with an embodiment of the present invention. FIG. 6 illustrates field device 200 communicating using wireless technologies including cellular, Wifi and Bluetooth. These communications may be performed simultaneously, or selectively based upon which data communication provider is most effective.

Although the present invention has been described with reference to preferred embodiments, workers skilled in the art will recognize that changes may be made in form and detail without departing from the spirit and scope of the invention.

What is claimed is:

1. A method of transmitting data from a field device, the method including:

obtaining process variable information;

selectively determining data communication signal strength of a plurality of data communication providers available to the field device by only determining data communication signal strength of the plurality of providers if a signal strength of an initial data communication provider is below a certain threshold;

transmitting the process variable information over a selected one of the plurality of data communication providers based at least in part upon the signal strength of the selected data communication provider;

storing event information related to connecting to the selected data communication provider wherein event information is accumulated to provide a statistical history of communication using any of the data communication providers;

analyzing the statistical history by performing at least one statistical operation on the history; and wherein selection of the selected data communication provider is based, in part, upon the statistical operation.

2. The method of claim 1, wherein at least one of the data communication providers employs cellular telephone communications.

3. The method of claim 1, wherein at least one of the data communication providers employs communications in accordance with IEEE 802.11b.

4. The method of claim 1, wherein at least one of the data communication providers employs communications in accordance with IEEE 802.11g.

5. The method of claim 1, wherein at least one of the data communication providers employs communications in accordance with IEEE 802.16.

6. The method of claim 1, wherein at least one of the data communication providers employs communications in accordance with Bluetooth.

7. The method of claim 1, wherein at least one of the data communication providers employs satellite communications.

8. The method of claim 1, wherein at least one of the data communications providers employs communication in accordance with IEEE 802.15.4.

9. The method of claim 1, wherein at least one of the data communication providers employs communications over a wired communication medium.

10. The method of claim 9, wherein the wired communication medium includes a process control loop.

\* \* \* \* \*